Oct. 28, 1958
P. A. HARTER
2,857,998
MAGNETIC TORQUE PRODUCING DEVICE
Filed March 30, 1954
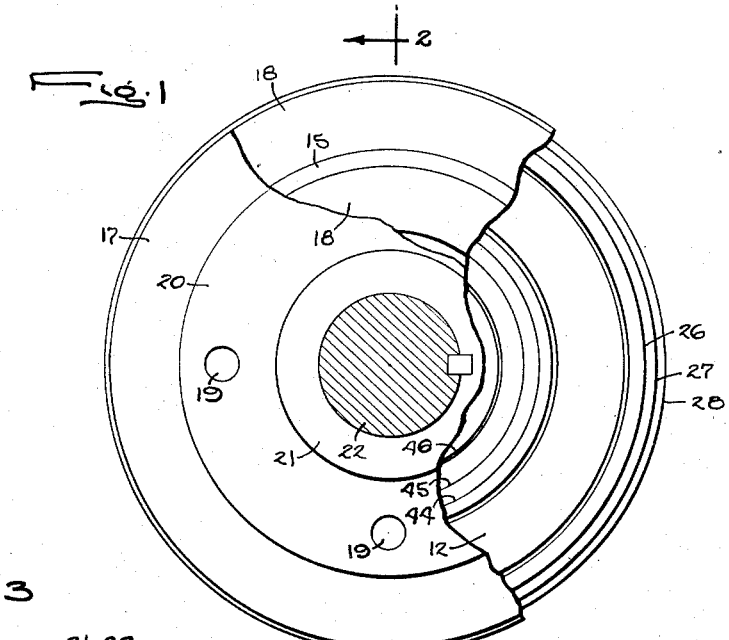
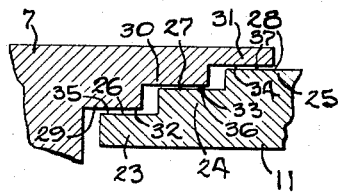
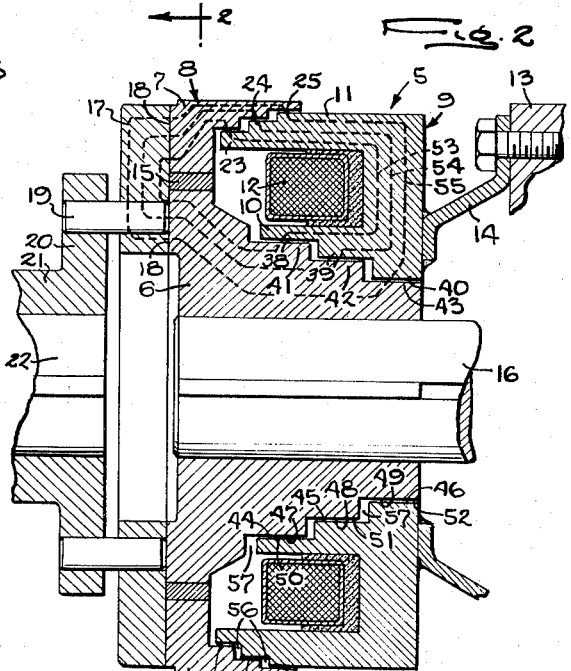
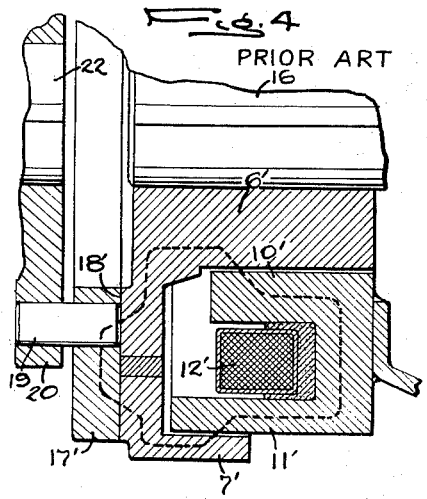
INVENTOR
Paul A. Harter
By Carlson, Pitzner Hubbard & Wolfe
ATTORNEYS

United States Patent Office 2,857,998
Patented Oct. 28, 1958

2,857,998

MAGNETIC TORQUE PRODUCING DEVICE

Paul A. Harter, Beloit, Wis., assignor to Warner Electric Brake & Clutch Company, Beloit, Wis., a corporation of Wisconsin Application March 30, 1954, Serial No. 419,856

6 Claims. (Cl. 192—84)

This invention relates to a magnetic torque producing device of the type comprising two relatively rotatable parts each composed of two concentric rings which telescope respectively with the rings of the other part. In such a device, an energizing coil disposed between the rings of one part creates a flux which threads a path through the rings of both parts, the path crossing radially from the ring of one part to the telescoping ring of the other part.

The general object of the invention is to provide a new and improved torque producing device of the above character in which, as compared to prior devices, the overall diameter is reduced without materially changing the operating characteristics of the device.

A more detailed object is to form a ring on one part with a plurality of axially spaced radially offset portions which telescope respectively with similar portions on the adjacent ring of the other part so that parts of the two rings are axially alined thereby effecting a reduction in diameter.

Other objects and advantages of the invention will become apparent from the following detailed description taken in connection with the accompanying drawings, in which Figure 1 is a transverse sectional view with parts broken away illustrating an electromagnetic friction clutch which embodies the novel features of the present invention.

Fig. 2 is a sectional view taken along the line 2—2 in Fig. 1.

Fig. 3 is an enlarged fragmentary sectional view of two telescoping rings.

Fig. 4 is a view similar to Fig. 2 but illustrating, for purposes of comparison, a conventional clutch.

For the purpose of illustration, the invention is shown embodied in an annular electromagnet 5 comprising inner and outer concentric pole rings 6 and 7 which are formed as a separate rigid unit 8 and telescope with the core 9 of the magnet. The core is a ring of U-shaped radial cross section with the inner and outer legs 10 and 11 of the U constituting pole pieces and telescoping respectively with the pole rings 6 and 7. An energizing coil 12 is disposed between the legs of the core and the latter is mounted on a stationary member 13 by means of a plate 14 welded to the back of the core and bolted to the member. A nonmagnetic spacer 15, which may be made of copper or stainless steel, is joined to each of the pole rings and rigidly connects but magnetically separates the rings to form the unit 8.

Magnets of the foregoing type are used in electromagnetic clutches and brakes such as the clutch disclosed in the drawings in which the pole ring unit 8 is keyed to a shaft 16 to constitute one rotating element of the clutch. The other clutch element is a flat armature disk 17 bridging concentric pole faces 18 formed on the ends of the pole rings 6 and 7. The armature slides axially on pins 19 projecting rigidly from the flange 20 of a sleeve 21 keyed to a second shaft 22 which is alined with the shaft 16. With this arrangement, the coil 12 when energized produces magnetic flux which threads a substantially closed path from the pole piece 10, across the radial gap between the latter and the pole ring 6, through the armature 17 and the pole ring 7 and across the radial gap between the ring 7 and the pole piece 11 as indicated in broken lines in Fig. 2. Such flux draws the armature into gripping engagement with the faces 18 of the pole rings 6 and 7 so that the armature and the unit 8 and hence the two shafts 16 and 22 turn together.

In accordance with the present invention, the overall diameter of the magnet 5 is reduced without altering the operating characteristics of the magnet by constructing the pole rings 6 and 7 and the pole pieces 10 and 11 in a novel manner so that a substantial portion of the pole rings are aligned axially with the pole pieces while, at the same time, the flux path crosses radially from each pole piece to the adjacent pole ring. To this end, the pole rings are formed with axially spaced radially offset cylindrical portions which telescope respectively with similarly spaced and offset cylindrical portions on the pole pieces. As a result, the magnetic flux threads, in effect, a plurality of separate parallel paths, one for each pair of telescoping cylindrical portions, and each path extends along one cylindrical portion of a pole ring and crosses radially to the telescoping portion of the adjacent pole piece through a gap between the two.

In the present instance, the outer pole piece 11 is formed with three cylindrical sections 23, 24 and 25. The intermediate section 24 projects axially beyond the end of the outer section 25 to constitute, in effect, an axial flange on the pole piece while the inner section 23 extends beyond the intermediate section and the three sections are accurately machined to provide outwardly facing cylindrical surfaces 26, 27 and 28 respectively. Similarly, the outer pole ring 7 is formed with three cylindrical sections 29, 30 and 31 but, in this case, the inner section 29 is the shortest to telescope with the inner section 23 of the pole piece 11 while the intermediate section 30 projects axially beyond the inner section and the outer section 31 extends beyond the intermediate section so that the sections 30 and 31 telescope respectively with the pole piece sections 24 and 25. Inwardly facing cylindrical surfaces 32, 33 and 34 are machined on the pole ring sections and are spaced from and oppose the cylindrical surfaces 26, 27 and 28 on the pole piece to define three narrow radial gaps 35, 36 and 37. Thus, these three gaps together constitute a single stepped gap between the pole piece 11 and the pole ring 7.

Preferably, the relation of the cross sectional areas of the gaps 35, 36 and 37 to each other is the same as the relation of the areas of the cylindrical sections 23, 24 and 25 on the pole piece 11 and as the relation of the cross sectional areas of the pole ring sections 29, 30 and 31. In other words, the same ratio exists between the sizes of the inner, intermediate and outer gaps as between the inner, intermediate and outer sections of the pole piece and also as between the corresponding sections of the pole ring. In the present instance, the gaps are made equal in area as are the pole piece sections and the role ring sections so that the reluctance of the flux path extending through one section of the pole piece, the telescoping section of the pole ring and the corresponding gap is substantially equal to the reluctance of the paths through the other two pairs of telescoping sections. Thus, in general, the flux produced by the coil 12 is equally divided among the three paths.

In a similar manner, the inner pole piece 10 is formed with three axially spaced radially offset cylindrical sections 38, 39 and 40 which telescope respectively with three cylindrical sections 41, 42 and 43 on the inner pole ring 6. Inwardly facing cylindrical surfaces 44, 45 and 46 on the inner pole piece sections oppose outwardly facing cylindrical surfaces 47, 48 and 49 on the inner pole ring sections and the two sets of surfaces cooperate to define narrow radial gaps 50, 51 and 52. As in the case of the outer pole piece 11 and the pole ring 7, the cross sectional areas of the inner pole piece and pole ring sections are the same and the axial lengths and radial widths of the gaps 50, 51 and 52 are equal.

With the foregoing arrangement, the magnetic flux created by the coil 12 threads three parallel paths as indicated by the broken lines 53, 54 and 55 in Fig. 2. The path 53 extends from the armature 17 through the pole ring section 29, radially across the gap 35 to the pole piece section 23, through the section 38 and across the gap 50 to the section 41. Similarly, the path 54 extends through the sections 30, 24, 39 and 42 and crosses the gaps 36 and 51 while the path 55 threads through the sections 31, 25, 40 and 43 and crosses the gaps 37 and 52.

To insure that the flux paths cross radially from pole ring to pole piece, the axially alined parts of the pole pieces and the pole rings are spaced apart distances equal to at least several times the widths of the radial gaps. In other words, the spaces 56 between the outer and intermediate sections 25 and 24 of the outer pole piece 11 and the opposing intermediate and inner sections 30 and 29 of the outer pole ring 7 are several times wider than the widths of the gaps 35, 36 and 37. Similarly, the axially alined parts 39, 40 and 41, 42 of the inner pole piece 10 and pole ring 6 are separated by spaces 57 which are substantially wider than the gaps 50, 51 and 52. As a result, the flux crosses from pole piece to pole ring through the lower reluctance radial gaps rather than through the higher reluctance axial spaces 56 and 57.

The reduction in diameter of the clutch obtained by virtue of the stepped arrangement will be apparent from a comparison of this construction with the conventional clutch shown in Fig. 4 in which the corresponding parts are indicated by the same but primed reference characters. In Fig. 4, the outer pole ring 7' is disposed wholly on the outside of the pole piece 11' while the inner pole ring 6' is inside the pole piece 10' and no part of either pole ring axially opposes any part of the adjacent pole piece. The cross sectional areas of the pole rings and pole pieces are the same as the areas of the corresponding parts in Fig. 2, the area of the pole ring 7', for example, being equal to the combined areas of the sections 29, 30 and 31. Also, the radial gaps 35, 36 and 37 and the axial length of the gap 58 is equal to the combined lengths of the three gaps. The same relation exists as to the gap 59 between the inner pole piece 10' and ring 6' and the gaps 50, 51 and 52. Thus, the reluctance of the flux path in the conventional clutch is the same as in the clutch constructed in accordance with the invention and, therefore, the two clutches possess the same operating characteristics. Due to the novel stepped construction of the pole rings and pole pieces in the improved clutch, however, the latter is substantially smaller in diameter than the conventional clutch. This reduction in diameter is obtained because the stepped construction permits parts of the pole pieces 10 and 11 to be alined axially with parts of the pole rings 6 and 7. In spite of such axial alinement, the flux path crosses radially from one pole ring to the adjacent pole piece, the same as in the conventional clutch.

I claim as my invention:

1. In a magnetic torque producing device, the combination of, first and second relatively rotatable supports, a magnet having inner and outer annular pole pieces concentrically mounted on said first support and each having stepped portions to provide radially and axially offset cylindrical surfaces and inner and outer rings rigidly but nonmagnetically joined together and concentrically mounted on said second support, each of said rings having stepped portions generally complementing the stepped portions on the corresponding pole pieces to provide a plurality of radially and axially offset cylindrical surfaces opposing and closely telescoping with the surfaces on said pole piece thereby to provide a divided flux path with portions of the path extending radially across the gap between each pair of opposed cylindrical surfaces.

2. In a magnetic torque producing device, the combination of, two relatively rotatable supports, a magnet including inner and outer concentric rings of magnetic material mounted on one of said supports and each having a plurality of radially and axially offset cylindrical surfaces, an inner annular pole piece mounted on the other of said supports coaxial with said rings and having a plurality of radially and axially offset cylindrical surfaces respectively telescoping closely with the cylindrical surfaces on said inner ring, an outer annular pole piece concentric with said inner pole piece and having radially and axially offset cylindrical surfaces similarly telescoping respectively with the cylindrical surfaces on said outer ring, and nonmagnetic means rigidly joining said rings.

3. In a magnetic torque producing device, the combination of, a ring of magnetic material, an annular pole piece coaxial with said ring and telescoping with the latter, the telescoping parts of said ring and said pole piece being stepped to provide a plurality of pairs of opposed closely spaced cylindrical surfaces with each pair axially and radially offset from the adjacent pair and with the axially alined portions of the ring and the pole piece spaced apart distances substantially greater than the spacing between the surfaces of each pair, a second annular pole piece concentric with and rigidly joined to said first pole piece, a second ring concentric with said first ring and telescoping with said second pole piece, nonmagnetic means rigidly joining said rings, and means supporting said rings for rotation relative to said pole pieces.

4. In a magnetic torque producing device, the combination of, a ring of magnetic material having a first outwardly facing cylindrical surface and a flange providing a second outwardly facing cylindrical surface of smaller diameter, a second coaxial ring closely telescoping with said flange and having an inwardly facing cylindrical surface opposing said second surface, a flange on said second ring closely telescoping with said first ring and providing an inwardly facing cylindrical surface opposing said first surface, said rings and said flanges providing a divided flux path with portions of the path extending radially across the gap between each pair of opposed cylindrical surfaces, a first annulus of magnetic material concentric with one of said rings and rigidly but nonmagnetically joined to the same to form a first magnet part, a second and coaxial annulus telescoping with said first annulus and connected to the other of said rings to form a second magnet part, and means supporting said parts for rotation relative to each other.

5. A magnetic device comprising first and second relatively rotatable supports, inner and outer annular pole rings of magnetic material rigidly mounted on said first support, a magnet including inner and outer annular pole pieces concentrically mounted on said second support and telescoping with said inner and outer pole rings, a plurality of radially and axially offset cylindrical surfaces formed on the telescoping end portion of one of said rings, and similarly offset but oppositely facing cylindrical surfaces formed on the adjacent end portion of the corresponding pole piece and respectively telescoping closely with the surfaces on said ring, said opposed cylindrical surfaces providing a divided flux path with portions of the path extending radially across the gap between each pair of opposed cylindrical surfaces.

6. In a magnetic torque producing device, the combination of, a first ring having a plurality of cylindrical portions of different lengths to provide a plurality of axially and radially offset outwardly facing cylindrical surfaces, a second and coaxial ring having a plurality of cylindrical portions of different lengths closely telescoping respectively with the cylindrical portions of said first ring and providing inwardly facing cylindrical surfaces opposing the surfaces on the first ring, said opposed cylindrical surfaces providing a divided flux path with portions of the path extending radially across the gap between each pair of opposed cylindrical surfaces, a first magnetic annulus rigidly connected to and concentric with said first ring to form with the latter a first magnet part, a second magnetic annulus concentric with and rigidly connected to said second ring to form a second magnet part and having a portion telescoping with a portion of said first annulus, and means supporting said parts for rotation relative to each other.

References Cited in the file of this patent

UNITED STATES PATENTS

| | | |
|---|---|---|
| 2,039,714 | Fuller | May 5, 1936 |
| 2,386,402 | Lilja | Oct. 9, 1945 |
| 2,548,624 | Sclater | Apr. 10, 1951 |

FOREIGN PATENTS

| | | |
|---|---|---|
| 387,487 | Germany | Dec. 28, 1923 |